United States Patent [19]
Wiley

[11] 3,826,985
[45] July 30, 1974

[54] SELF-POWERED TACHOMETER CIRCUIT
[75] Inventor: Daryl D. Wiley, Elmhurst, Ill.
[73] Assignee: Motorola, Inc., Franklin Park, Pa.
[22] Filed: June 20, 1973
[21] Appl. No.: 371,841

Related U.S. Application Data
[63] Continuation of Ser. No. 149,937, June 4, 1971, abandoned.

[52] U.S. Cl. .............................. 324/173, 324/174
[51] Int. Cl. ............................................ G01p 3/48
[58] Field of Search ............ 324/169, 173, 174, 127

[56] References Cited
UNITED STATES PATENTS
2,724,821  11/1955  Schweitzer, Jr. .................... 324/127
3,293,636  12/1966  Dunne .............................. 324/174
3,573,619   4/1971  Ivec ................................. 324/174

OTHER PUBLICATIONS
Goodman, B.; The Radio Amateur's Handbook; 1963; pgs. 236–240; pub. by Am. Radio Relay League, W. Hartford.

*Primary Examiner*—Alfred E. Smith
*Assistant Examiner*—Ernest F. Karlsen
*Attorney, Agent, or Firm*—Mueller, Aichele & Ptak

[57] ABSTRACT

A self-powered tachometer circuit utilizing variable reluctance pickup means applies the induced signal to a bridge network for full wave rectification after the maximum amplitude of the voltage has been limited and the signal differentiated to obtain pulses of uniform amplitude and uniform duration. The fully rectified signal is then applied to a meter for indicating repetition rate. Another embodiment using variable reluctance pickup means applies the induced pulses to a voltage doubler circuit for fast voltage pickup and operates a transistor switching circuit to drive the meter. A capacitor discharges through the transistor with input pulses of one polarity while the capacitor is charged through the meter with pulses of the opposite polarity.

5 Claims, 13 Drawing Figures

PATENTED JUL 30 1974　　　　　　　　　　　3,826,985

INVENTOR
DARYL D. WILEY
By

Mueller & Aichele
ATTYS.

SELF-POWERED TACHOMETER CIRCUIT

This is a continuation of application Ser. No. 149,937 filed June 4, 1971, now abandoned.

BACKGROUND OF THE INVENTION

Tachometers have generally required independent power sources when using variable reluctance pickup means for obtaining an indication of repetition rate. Wet cell batteries or alternators have supplied the independent source power in automobiles. Similar tachometers have been used for industrial machinery and small magneto operated engines, and have consequently also required independent power sources.

Power supplies which are not independent have been used in radio receivers which derive power from radio waves, i.e., electromagnetic radiation. More often than not the frequency of the power generating signal has been different from that of the information bearing signal. Consequently, separate tuning is necessary for both power and information bearing signals, thus requiring additional circuitry. Both the above described tachometers and radios normally require more power than can be supplied by the signal source alone.

Tachometers utilizing a mechanical coupling to a generator or flywheel to provide power and/or a signal indicative of the repetition rate normally cost more than those operating with a magnetic sensor. The number of moving parts, including the bearing and gearing arrangements, with the close tolerances required and the necessary maintenance lead to higher costs.

SUMMARY OF THE INVENTION

It is an object of the present invention to provide a self-powered tachometer circuit.

It is another object of this invention to provide a self-powered tachometer circuit requiring neither an external direct current voltage source nor a mechanically coupled generator or alternator for activating the meter movement.

It is still another object of this invention to provide a tachometer circuit in which there are no moving parts save a cyclically moving member and a meter.

It is yet another object of this invention to provide a self-powered tachometer circuit which requires less power to operate than conventional tachometer circuits.

The flywheel apparatus and pickup means of an automobile tachometer embodying this invention consist of a rod of soft steel wrapped in several hundred turns of wire and magnetized by a small permanent magnet positioned at one end for creating magnetic flux. The opposite end is positioned in close proximity to the rotating flywheel so the passing gear teeth of the ring gear cause the magnetic flux to change. Both polarities of the signal peaks of the induced signal are limited by oppositely poled zener diodes connected across the pickup means. In the linear range of operation of the tachometer circuit clipping continuously occurs. The clipped signal is applied across a series capacitor and resistances to differentiate the signal and maintain a pulse of uniform duration. The uniform pulse signal is then applied across resistances in parallel with a diode bridge network which performs full wave rectification and activates the meter to register an indication of repetition rate on the dial face.

In another embodiment a similar oscillating source and pickup means are utilized. A voltage doubler connected to the output of a variable reluctance pickup means is limited in output by a zener diode. The doubler powers a transistor which discharges a capacitor while operating during the positive wave of the pickup signal. During the negative wave of the induced signal the doubler charges the capacitor through the meter and indicates the rate of oscillation on the face of the dial.

DETAILED DESCRIPTION

Automobile tachometers commonly obtain an indication of engine speed by electrically metering the ignition pulses. These tachometers require a source of electrical power such as a battery or alternator to activate the meter.

Figure 1:
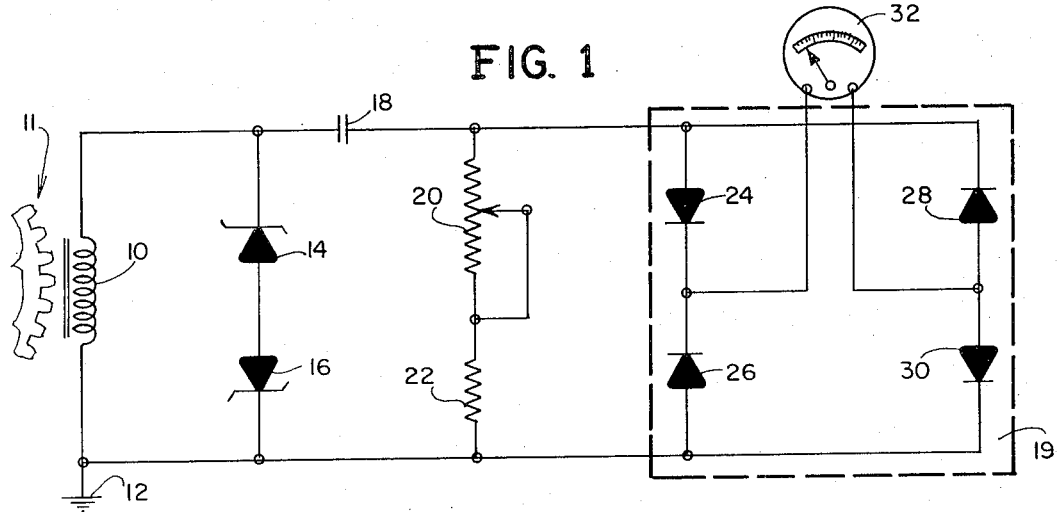
FIG. 1 is a schematic circuit diagram in accordance with one embodiment of the present invention.
Figure 2:
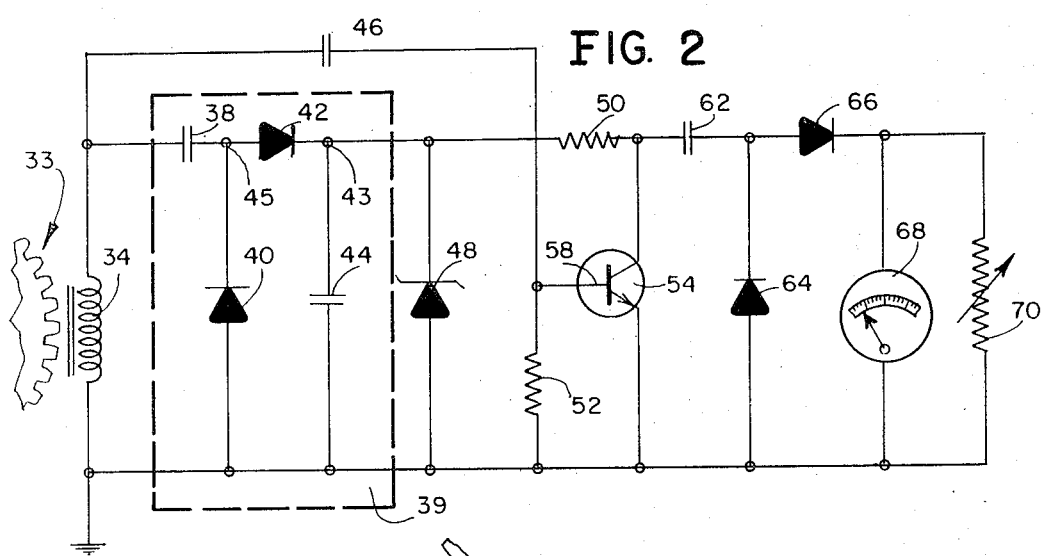
FIG. 2 is a schematic circuit diagram illustrating a second embodiment of the invention.

FIGS. 1 and 2 show schematic circuit diagrams of self-powered tachometers including variable reluctance pickup devices 10 and 34. The operation of the variable reluctance pickup devices is not dependent upon their distance from the ring gears 11 or 33 (FIGS. 1 and 2 respectively) which induce the oscillating signal provided the induced signal peaks remain larger than the cutoff voltages of the voltage limiting diodes. The induced signals in pickup devices 10 and 34 provide both the power and signals to operate the meters 32 and 68 (FIGS. 1 and 2 respectively) and thus eliminate the necessity of independent power sources. The pickup device shown in FIG. 3 includes a rod 72 of soft steel with several hundred turns of wire 74 wound around it. A small permanent magnet 76 mounted at one end of the rod magnetizes the apparatus. The current induced in the coil of wire 74 depends upon the variance of the magnetic flux density. As the gear teeth of the ring gear 78 of the flywheel pass the rod with the resultant change in distance from the magnetized rod 72 to the closest portion of the gear, i.e., a gear tooth or tooth space, the flux varies.

In both embodiments variable reluctance means 10 and 34 (FIGS. 1 and 2) are grounded and in parallel with voltage limiting devices. In FIG. 1 a pair of oppositely poled zener diodes 14 and 16 connected in series across the variable reluctance pickup means to the reference potential 12 limits the induced signal. A signal of either polarity will cause the reverse biased zener diode to break down and conduct with the other zener of the pair conducting as a regular diode. The effect of the combination of zener diodes is to limit, or clip, both positive and negative waves of the induced signal. Clipping the signal maintains an essentially constant amplitude voltage source for operating the remaining circuitry.

In FIG. 1 the clipped signal is differentiated by the series combination of capacitor 18, calibrating rheostat 20 and resistor 22 to provide a pulse of uniform duration. Thereafter the pulse of constant amplitude and uniform duration is applied to the bridge circuit 19, which comprises diodes 24, 26, 28 and 30 and which fully rectifies the signal for the movement of meter 32, which is normally of the D'Arsonval type.

In the operation of the bridge, current flows through diode 24, the meter 32 and diode 30 to ground when positive pulses are picked up. For negative pulses, however, current flows through diode 26, the meter 32 and diode 28. The rheostat 20 and series resistor 22 are connected in parallel across the bridge circuit 29 and calibrate the bridge circuit and meter combination so that readings on the meter dial face correspond to the rate of revolutions of the ring gear 11, which is proportional to the induced oscillations' repetition rate. This tachometer circuit utilizes nearly all of the induced signal to power the meter and consequently has little power loss.

Figure 3:
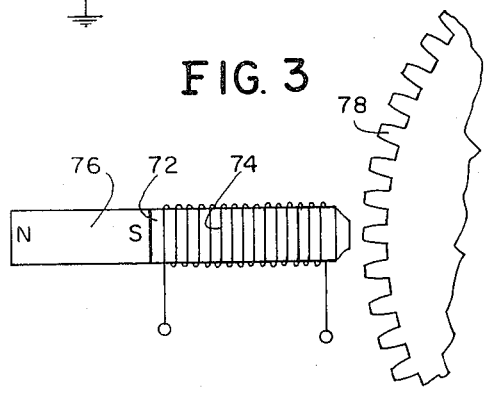
FIG. 3 is a side elevation view of an oscillating signal source and pickup means.

In the case of the auto ring gear illustrated in FIG. 3 at 78, a full cycle, or oscillation, will occur for each complete movement of a gear tooth and gear tooth space in front of the magnetized rod 72. The power generated by the oscillations as the gear revolves is proportional to the oscillation rate. Since a D'Arsonval movement normally used in meters is controlled by the power supplied and since the oscillation rate is proportional to the revolution rate of the gear 78, there being a set number of oscillations for each revolution, measurements of power will be proportional to the revolution rates of the ring gear 78. Consequently, with an appropriate dial face the meter can be accurately calibrated to reflect the revolution rate of the ring gear.

In FIG. 2, showing another embodiment of the invention, the induced signal activates the meter 68 only during the negative wave of the signal. The D'Arsonval type of meter movement used in tachometers is physically limited in reaction time so it cannot register absences of half cycles of signals applied where the frequencies of the signals registerd are normally on the order of at least 30 cycles per second. This type of meter movement therefore provides an accurate power dependent measuring device. Capacitor 38 rapidly charges to full value during the initial negatively induced waves, with diode 40 poled to prevent the voltage drop from junction 45 to reference ground 36 from going negative. During positive waves which alternately follow, capacitor 38 discharges partially into capacitor 44 through diode 42. This voltage across capacitor 44 is essentially the series combination of the voltages across pickup 34 and capacitor 38. Hence, the signal at junction 43 is maintained at a higher level than that of either the positively or negatively induced signals across pickup 34. The positively induced wave at pickup 34 is doubled at junction 43, across capacitor 44. Capacitor 44 stores energy for rapid voltage buildup at junction 43. The zener diode 48, across the output, junction 43 to ground 36, of the doubler clips the signal doubler 39 output to maintain a uniform level.

On negative-going signals the voltage on the doubler capacitor 44 is applied through resistor 50, capacitor 62, diode 66 and the meter 68 to ground thereby charging capacitor 62 and operating meter 68. With a positive signal at variable reluctance pickup 34, the pulse is applied through capacitor 46 to the base 58 of transistor 54 to turn on that transistor thereby discharging capacitor 62 to ground. It is important to maintain a short "on" time for transistor 54 because of the loading effect on capacitor 44 of resistor 50 and the collector to emitter to ground path of transistor 54 when capacitor 62 is discharging. The time base circuit comprising capacitor 46 and resistor 52 permits rapid charge up of capacitor 46 to turn off transistor 54 in a short time thereby conserving the power of the voltage doubler.

The meter 68 is protected by diode 64 which revents it from being negatively biased. The meter is then calibrated by rheostat 70 for indicating the rate of repetition of the induced oscillations. Here the dial face of the meter is designed to be read in the revolution rate of the ring gear.

The configuration in FIG. 2 may, of course, be altered so that positive rather than negative induced waves activate the meter.

Both embodiments of FIGS. 1 and 2, however, do provide self-powered apparatus for translating a continuous indication of an oscillation rate into a periodic electric signal and registering this signal on a meter. The electrical system of the invention may naturally be utilized in other devices for indicating the repetition rate of a cyclically moving member. In both embodiments of this invention there is a variable reluctance means which picks up changes in magnetic flux to produce an induced signal. Each circuit measures the reshaped wave with the meter indications being controlled by the pulse width and height, i.e., in essence the input power.

What we have, therefore, is a self-powered tachometer circuit utilizing a variable reluctance pickup means for supplying, from a single source, power for a meter and the signal to activate the meter.

I claim:

1. A self-powered tachometer circuit for indicating engine RPM including in combination, variable reluctance pickup means having first and second terminals, with said first terminal being connected to a reference potential, moving means operated by the engine for inducing in said pickup means an alternating current having a frequency proportional to the speed of engine revolutions, meter means for indicating the engine RPM having first and second terminals, with said second terminal connected to the reference potential, a voltage doubler circuit connected to said second terminal of said variable reluctance pickup means and to the reference potential and having an output terminal for providing a voltage with respect to the reference potential for energizing the circuit, pulsing circuit means connected in circuit with said variable reluctance pickup means, said pulsing circuit means including a first capacitor having first and second electrodes, with said first electrode connected to said output terminal of said voltage doubler and said second electrode coupled to said first terminal of said meter means, an electron switch connected between said first electrode of said first capacitor and the reference potential and having a control terminal, and a second capacitor connected between said second terminal of said variable reluctance pickup means and said control terminal of said electron switch, said first capacitor being charged by said voltage doubler circuit to apply potential to said meter means, said second capacitor being responsive to a signal of a predetermined polarity from said variable reluctance pickup means to apply a potential to said control terminal of said electron switch to actuate the same and discharge said first capacitor.

2. A self-powered tachometer circuit according to claim 1 wherein said electron switch is a transistor having collector, emitter and base electrodes, with said collector electrode connected to said first electrode of said capacitor, said emitter electrode connected to the reference potential, and said base electrode forming said control terminal.

3. A self-powered tachometer circuit in accordance with claim 1 further including a resistor connected between said control terminal and the reference potential, said resistor having a value to permit charging of said second capacitor in a short time to de-actuate said electron switch and allow said first capacitor to charge from said voltage doubler circuit.

4. A self-powered tachometer circuit in accordance with claim 1 including voltage reference means connected across said voltage doubler circuit for providing a substantially constant voltage thereacross.

5. In a self-powered tachometer circuit, the combination including,
- variable reluctance pickup means having first and second terminals with said first terminal connected to a reference potential,
- a rotating structure having ring gear means for cyclically inducing an alternating current in said pickup means having a frequency proportional to the revolution rate of said rotating structure,
- a voltage doubler circuit connected to said second terminal of said variable reluctance pickup means and to the reference potential and having an output terminal for providing a voltage with respect to the reference potential,
- a meter having first and second terminals with said second terminal connected to the reference potential,
- means including a first capacitor having a first electrode connected to said output terminal of said voltage doubler circuit and a second electrode coupled to said first terminal of said meter,
- discharge circuit means connected to said first capacitor including a transistor having a control electrode, and output electrodes connected between said first electrode of said first capacitor and the reference potential,
- a second capacitor connected between said second terminal of said variable reluctance pickup means and said control electrode,
- said first capacitor being charged from said voltage doubler circuit in response to a signal from said pickup means of one polarity followed by a signal of the opposite polarity to operate said meter,
- resistor means connected between said control electrode and the reference potential and in series with said second capacitor to form a time base circuit therewith having a relatively short time constant,
- said second capacitor being responsive to a signal from said pickup means of said opposite polarity to energize said transistor thereby discharging said first capacitor, said second capacitor charging in a relatively short time to turn off said transistor thereby stopping the discharge of said first capacitor to permit the same to be charged by said voltage doubler circuit.

* * * * *